(12) United States Patent
Rabii et al.

(10) Patent No.: US 9,501,572 B2
(45) Date of Patent: Nov. 22, 2016

(54) CONTENT PLACEMENT CRITERIA EXPANSION

(75) Inventors: Bahman Rabii, San Francisco, CA (US); Xiaodan Song, San Jose, CA (US); Yingwei Cui, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 849 days.

(21) Appl. No.: 13/538,425

(22) Filed: Jun. 29, 2012

(65) Prior Publication Data
US 2014/0006407 A1    Jan. 2, 2014

(51) Int. Cl.
*G06F 17/30* (2006.01)

(52) U.S. Cl.
CPC .............. *G06F 17/30867* (2013.01)

(58) Field of Classification Search
CPC .............. G06F 17/3071; G06F 17/30864; G06F 17/30598; G06F 17/30306; G06F 17/30572
USPC ........................................ 707/737
See application file for complete search history.

(56) References Cited

U.S. PATENT DOCUMENTS

| | | | |
|---|---|---|---|
| 7,937,288 B2 | 5/2011 | Blaser et al. | |
| 2003/0023485 A1 | 1/2003 | Newsome | |
| 2006/0095521 A1* | 5/2006 | Patinkin | 709/206 |
| 2009/0112690 A1* | 4/2009 | Brady | G06Q 30/02 705/7.33 |
| 2009/0210385 A1 | 8/2009 | Ramaswamy et al. | |
| 2009/0216799 A1* | 8/2009 | Manjrekar et al. | 707/103 Y |
| 2009/0300031 A1 | 12/2009 | Lejano et al. | |
| 2009/0327346 A1* | 12/2009 | Teinila et al. | 707/104.1 |
| 2010/0017487 A1* | 1/2010 | Patinkin | 709/206 |
| 2010/0082431 A1* | 4/2010 | Ramer et al. | 705/14.52 |
| 2010/0257023 A1 | 10/2010 | Kendall et al. | |
| 2010/0324990 A1 | 12/2010 | D'Angelo et al. | |
| 2011/0106611 A1 | 5/2011 | Chang et al. | |
| 2011/0125573 A1* | 5/2011 | Yonezaki et al. | 705/14.48 |

FOREIGN PATENT DOCUMENTS

EP    1 083 504 A2    3/2001

OTHER PUBLICATIONS

International Search Report and Written Opinion dated Sep. 16, 2013 in PCT Application No. PCT/US2013/045889 (10 pages).

* cited by examiner

*Primary Examiner* — Dinku Gebresenbet
(74) *Attorney, Agent, or Firm* — Fish & Richardson P.C.

(57) ABSTRACT

Systems and methods of providing information via a computer network are provided. A data processing system can identify a cluster that includes a plurality of online content items having a semantic or user similarity. The data processing system determines a plurality of cluster placement criteria of the cluster, and receives content configured for display with a web page. The content can be associated with the cluster based on the semantic or user similarity. A cluster placement criterion of the plurality of cluster placement criteria can be selected based on a quality metric of the selected cluster placement criterion, and the selected cluster placement criterion can be provided as a supplemental criterion used to select the content for display with the web page.

15 Claims, 3 Drawing Sheets

CONTENT PLACEMENT CRITERIA EXPANSION

BACKGROUND

In a networked environment such as the Internet, entities such as people or companies provide information for public display on web pages. The web pages can include text, video, or audio information provided by the entities via a web page server for display on the Internet. Additional content such as advertisements can also be provided by third parties for display on the web pages together with the information provided by the entities. Thus, a person viewing a web page can access the information that is the subject of the web page, as well as third party advertisements that may or may not be related to the subject matter of the web page.

SUMMARY

At least one aspect is directed to a computer implemented method of providing information via a computer network. The method identifies, by a data processing system, a cluster of a plurality of online content items. The plurality of content items can share at least one of a semantic similarity and a user similarity. The user similarity can be based on user induced activity of at least one computing device on the computer network. The method determines a plurality of cluster placement criteria of the cluster, and receives content configured for display with a web page. The method associates the content with the cluster based on at least one of the semantic similarity and the user similarity. The method selects a selected cluster placement criterion of the plurality of cluster placement criteria based on a quality metric of the selected cluster placement criterion, and provides the selected cluster placement criterion as a supplemental criterion used to select the content for display with the web page.

At least one aspect is directed to a system of providing information via a computer network. The system includes a data processing system having a criteria expansion circuit. The data processing system can define a cluster of a plurality of online content items. The plurality of content items can share at least one of a semantic similarity and a user similarity. The user similarity can be based on user induced activity of at least one computing device on the computer network. The data processing system can determine a plurality of cluster placement criteria of the cluster, and can receive content configured for display with a web page. The data processing system can include the content with the cluster based on at least one of the semantic similarity and the user similarity, and can select a selected cluster placement criterion of the plurality of cluster placement criteria based on a quality metric of the selected cluster placement criterion. The data processing system can provide the selected cluster placement criterion as a supplemental criterion used to select the content for display with the web page.

At least one aspect is directed to a computer readable storage medium having instructions to provide information on a computer network. The instructions include instructions to identify a cluster of a plurality of online content items. The plurality of content items can share at least one of a semantic similarity and a user similarity. The user similarity can be based on user induced activity of at least one computing device on the computer network. The instructions include instructions to determine a plurality of cluster placement criteria of the cluster, and to receive content configured for display with a web page. The instructions include instructions to include the content with the cluster based on at least one of the semantic similarity and the user similarity, and to select a selected cluster placement criterion of the plurality of cluster placement criteria based on a quality metric of the selected cluster placement criterion. The instructions include instructions to provide the selected cluster placement criterion as a supplemental criterion used to select the content for display with the web page.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
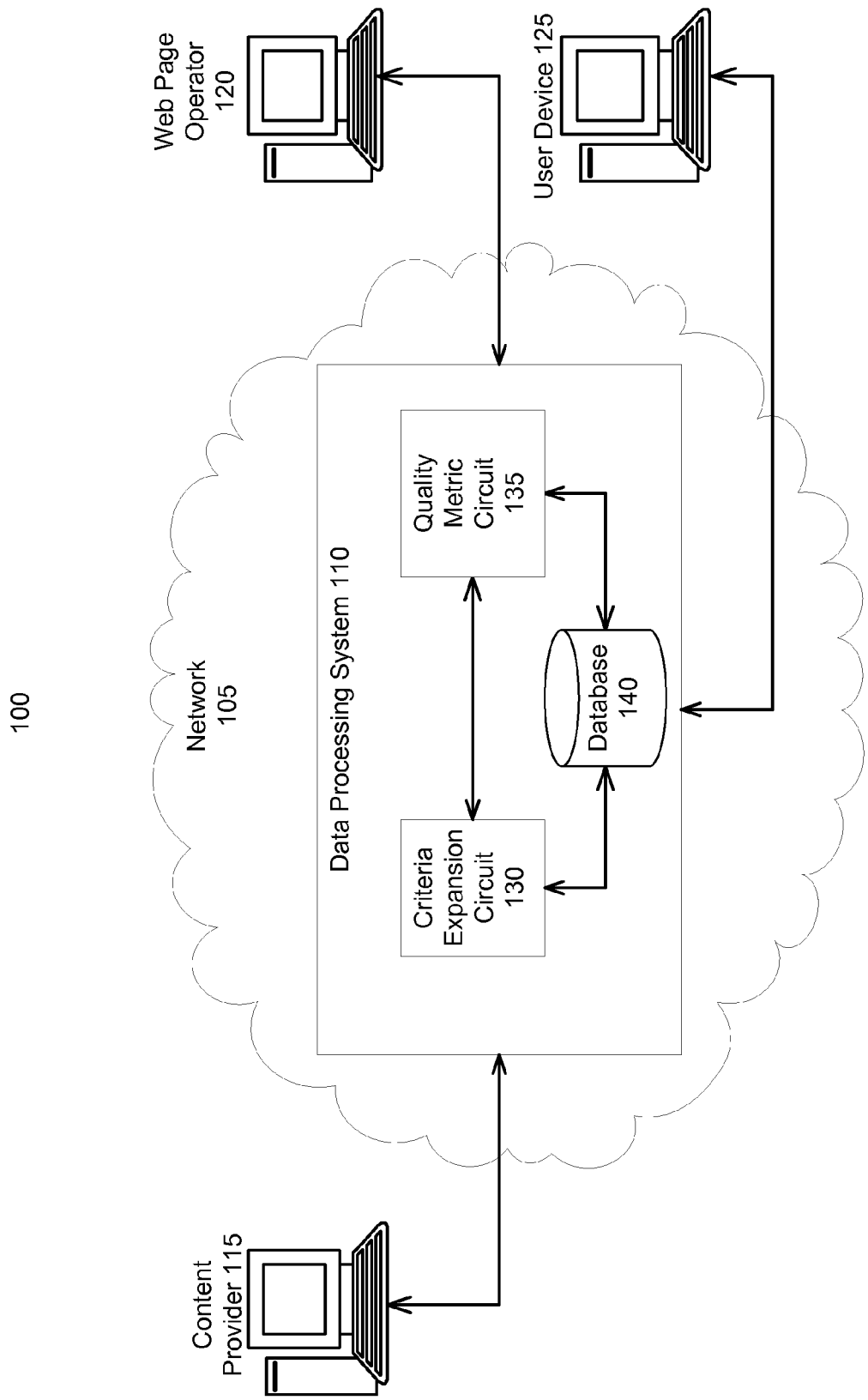
FIG. 1 is a block diagram depicting an example environment to provide information on a computer network, according to an illustrative implementation.

Following below are more detailed descriptions of various concepts related to, and embodiments of, methods, apparatuses, and systems for providing information via a computer network. The various concepts introduced above and discussed in greater detail below may be implemented in any of numerous ways, as the described concepts are not limited to any particular manner of implementation. Examples of specific implementations and applications are provided primarily for illustrative purposes.

In a networked environment such as the Internet, a content provider (e.g., an advertiser) can specify placement criteria that, when satisfied, results in online content (e.g., an ad) from that content provider being placed on a web page (or other online document). For example, an advertiser can provide content placement criteria (e.g., a keyword, index term, placement indicator, geographic limiter, or interest indicator) that generally indicates web pages or categories of web pages that may be suitable recipients for the ad (or other online content). A data processing system (e.g., ad placement server) can receive the placement criteria and use the placement criteria to identify a suitable web page for display of the ad. The quality of the placement criteria provided by the advertisers can vary, and some placement criteria are more effective than others at identifying suitable web pages.

The data processing system can identify and offer additional content placement criteria to supplement or replace the placement criteria provided by the content provider for content such as an ad. In one implementation, the data processing system can form clusters of ads (or other content). The ads that form the cluster generally share a common characteristic such as a semantic similarity or a user similarity. The semantic similarity can indicate common subject matter between the ads of the cluster. For example, content related to selling wedding rings and content related to selling engagement rings can be identified as semantically similar. Content related to wedding rings and content related to honeymoon destinations can be semantically different but share a user similarity, as a generic, anonymous user interested in wedding rings may also be interested in honeymoon destinations. One ad can belong to more than one cluster.

The clusters of ads can have cluster placement criteria, taken for example from the best performing placement criteria of the ads that form the cluster. For example, the cluster placement criteria can include keywords used by the data processing system to place one or more ads of the cluster with a web page. The performance of the placement criteria can be determined based on a click through rate, conversion rate, or other quality metric, compared for example with a threshold to select the best performing criteria. When the data processing system receives content (e.g., an ad) for display with a web page, the data processing system can associate the content with a cluster, based for example on semantic or user similarities between the content and the cluster. For example, the data processing system can determine that the placement criteria of the content (e.g., keywords) and placement criteria of the cluster are semantically similar, or have a user similarity. In this example, the data processing system can receive a new ad and include the new ad (or other content) in a cluster of other ads.

In some implementations, the data processing system can evaluate the cluster placement criteria of the cluster of ads, and identify a well performing cluster placement criterion from that cluster. A well performing cluster placement criterion can be a criterion having a sufficiently high click through rate when used to place ads or other content of the cluster. The well performing keyword or other placement criterion of the cluster can be selected as a supplemental criterion for the newly received ad or other content. For example, a cluster criterion having a click through rate (or other quality metric) above a threshold value can be selected as a supplemental criterion to be added to, or associated with other content of the cluster, such as the newly received ad. The newly received ad (or other content) can also have content placement criteria. In some examples, the content placement criteria of the newly received ad can be expanded to include the supplemental criterion. Thus, in one example, placement criteria of ads or other content can be expanded to include well performing placement criteria of clusters of semantically or user-similar content.

FIG. 1 illustrates an example system 100 of providing information via at least one computer network, such as network 105. The network 105 can include computer networks such as the Internet, local, wide, metro or other area networks, intranets, satellite networks, and other computer networks such as voice or data mobile phone communication networks. The system 100 can also include at least one data processing system 110. The data processing system 110 can include at least one logic device such as a computing device having a processor to communicate via the network 105, for example with at least one content provider 115, at least one web page operator 120, and at least one user device 125.

The data processing system 110 can include at least one server. For example, the data processing system 110 can include a plurality of servers located in at least one data center. In one implementation, the data processing system 110 includes an ad placement system. The data processing system 110 can also include at least one criteria expansion circuit 130, at least one quality metric circuit 135, and at least one database 140. The criteria expansion circuit 130 and the quality metric circuit 135 can each include at least one processing unit or other logic device such as programmable logic arrays configured to communicate with the database 140. The criteria expansion circuit 130 and the quality metric circuit 135 can be separate components, a single component, or part of the data processing system 110.

In one implementation, the data processing system 110 identifies a cluster of online content items such as advertisements ("ads") or other content. The cluster of ads can include, for example, an ad group obtained by the data processing system 110 from the content provider 115 or the database 140. The ads of the ad group can have similar subject matter, such as a group of ads for the same or a related good or service. For example, the content provider 115 can provide an ad group for the data processing system 110 to place ads from the ad group with web pages of at least one web page operator 120 via the network 105 as part of an online ad campaign.

The data processing system 110 can group ads or other content into clusters based on a semantic similarity between the ads. For example, the data processing system 110 can evaluate the content of a web page or other document to determine the subject matter of the content. The data processing system 110 can analyze the text, header, or title of the ad, keywords or other placement criteria associated with the ad, or metadata associated with the ad to determine the subject matter of the ad. In one implementation, the data processing system 110 determines that at least two ads are semantically similar, and defines these two ads as being part of a cluster.

The degree of semantic similarity between content can vary. For example, the data processing system 110 can determine that two ads for different wedding rings have semantic similarity, as they are both related to the same subject matter, e.g., wedding rings. In another example, an ad for wedding rings and an ad for engagement rings may also be identified as semantically similar, as they both relate to rings generally. The data processing system 110 can determine that semantically similar ads form part of a cluster, and can communicate this information indicating clustering relationships between content to the database 140. Semantic similarity between different pieces of content can be based on overlapping subject matter, such as common keywords, text, or images between content, or based on synonyms between the content, for example.

The data processing system 110 can also identify clusters of ads or other content based on a user interest similarity between the content. For example, the data processing system 110 can evaluate an ad for wedding rings and an ad for a tropical beach vacation. The subject matter of the ads in this example can be identified as different, e.g., not semantically similar in this example. In one implementation, the data processing system 110 determines a user interest similarity between these two ads, as anonymous users in general who are interested in wedding rings may also be interested in a tropical beach vacation, for example as a honeymoon. Ads or other content identified as having a user similarity can be identified by the data processing system 110 as being part of a cluster.

In one implementation, the data processing system 110 obtains information about activity of the user device 125 on the network 105. This user device activity can include activity that is under the control of or induced by a user operating the user device 125, such as internet browsing activity. For example, the data processing system 110 can receive a cookie or other piece of data that indicates information resources (e.g., website, web pages, domain names, or uniform resource locators) of the network 105 that are accessed by the user device 125. From this data, the data processing system 110 can determine interests of an anonymous user. For example, user device activity may indicate that an anonymous user is interested in multiple categories of non-semantically similar subject matter, such as wedding rings and tropical beach vacations. From this data, the data processing system 110 can determine that anonymous users interested in wedding rings may also be interested in tropical beach vacations. In some implementations, the data processing system 110 can identify user similarities that also have a degree of semantic similarity, such as wedding rings and wedding cake. The user can opt-in to allow the collection of cookies or other data from the user device 125, and can opt-out to prevent the collection of this data. The data processing system 110 can identify user similarities anonymously, without identifying any individual user.

The data processing system 110 can also determine that multiple pieces of content (e.g., different ads) are part of at least one cluster based on a mix of semantic similarity and user interest similarity. For example, the data processing system 110 can determine a user similarity between an ad for wedding rings and an ad for wedding cake. In this example, the subject matter (wedding rings and wedding cake) has a degree of subject matter similarity as both ads relate to wedding subject matter. The data processing system 110 can also determine that these ads have user similarity, as a user interested in wedding ring ads may be planning a wedding and also interested in ads for wedding cake, for example.

The cluster generally indicates an association between two or more ads or other pieces of content based on a semantic similarity between the subject matter of the ads, or based on a determined common user interest (e.g., user similarity) in the ads. In various implementations, the data processing system 110 identifies a plurality of ads as being part of a cluster, or defines a cluster as including a plurality of ads (or other content). In some embodiments, an ad may be part of more than one cluster. For example, a wedding ring ad can be part of a general ring cluster, part of a wedding ring specific cluster, or part of a user interest cluster that includes wedding related content and tropical vacation content.

Ads or other content of a cluster can include placement criteria, such as keywords or other index terms that indicate the subject matter of the ad, or that indicate a class, category, or genre of web pages as suitable for display of the ad. In one implementation, the data processing system 110 determines cluster placement criteria of a cluster of content. For example, the cluster placement criteria can include some or all of the keywords of the ads that form all or part of the cluster.

In some implementations, the data processing system 110 obtains content placement criteria corresponding to ads or other content. The ads can be grouped into one or more clusters, and the cluster placement criteria of a cluster can include the content placement criteria of the individual ads that form the cluster. The content placement criteria (e.g., keywords) of the cluster can be used to provide any ad of the cluster for display with a web page, e.g. of the web page operator 120 at the user device 125. For example, a first ad has a first keyword, and a second ad has a second keyword.

The data processing system 110 can determine that the first and second ads are part of one cluster. In this example, the cluster placement criteria of the cluster include the first keyword and the second keyword. The data processing system 110 can provide any ad of the cluster for display with a web page based on any of the cluster placement criteria. For example, the data processing system 110 can provide the first ad for display with a web page at the user device 125 based on an evaluation of the first keyword or the second keyword and the subject matter of the web page (or the terms of a search query). In one implementation, the placement criteria include the keywords of the content of the cluster that have a click through rate (or other quality metric) above a threshold level.

In some implementations, the data processing system 110 obtains content (e.g., an ad) for display with a web page. For example, the content can be configured for display in an ad slot of a web page of the web page operator 120 when the web page is rendered at the user device 125. The content can be received by the data processing system 110 from the content provider 115. In some embodiments, the data processing system 110 identifies a cluster similar to the received content. For example, responsive to receiving an ad for wedding rings, the data processing system 110 can identify a cluster such as a wedding ring cluster (e.g., a group of ads for wedding rings), or a ring cluster, or a honeymoon destination cluster, for example. The data processing system 110 can identify semantic or user interest similarities between the received content and one or more clusters, and ads or other content can be associated with or included as part of a cluster based on the semantic or user interest similarities.

In one implementation, the quality metric circuit 135 can determine click through rates or other quality metrics of the placement criteria of the cluster. For example, the quality metric circuit 135 can determine that one placement criterion associated with a cluster has a click through rate of 25%, indicating that 25% of the users who view content placed on a web page using the placement criterion proceed to click on the content. The quality metric circuit 135 can determine other quality metrics as well, such as the conversion rate (indicating a number of users who clicked on an ad or other content and took further action such as purchased a product offered by the ad). The quality metric circuit 135 can also determine click through volumes or conversion volumes of placement criteria of the cluster. The example volume based quality metrics indicate the number of anonymous users who click on or convert ads or other content. To determine a quality metric of a placement criterion, the quality metric circuit 135 can obtain indications that the placement criterion was used to place an ad (or other content) on a web page (or other network document). The quality metric circuit 135 can also obtain (e.g., from the user device 125 or from the web page operator 120) an indication that the ad displayed with a web page at the user device 125 was clicked on or converted.

Information used by the quality metric circuit 135 can be received by the data processing system 110 as a cookie and stored in the database 140. The activity of users on the network 105 can be maintained in an anonymous fashion so that individuals cannot be identified from activity of the user device 125 on the network 105. Information about the activity of the user device 125 can be collected on an opt-in basis, and users of the user device 125 can opt-out of the collection of their user activity information. Identifiers associated with the user device 125, such as a cookie can be evaluated by the data processing system 110 without regard to the actual identity of the individual person using the user device 125.

The data processing system 110 can identify at least one cluster placement criterion from the placement criteria of a cluster. For example, the criteria expansion circuit 130 can select at least one placement criterion from a cluster that has semantic or user interest similarity with an ad or other content. In one implementation, the data processing system 110 evaluates the quality metrics of the group of cluster placement criteria and selects at least one placement criterion. For example, the criteria expansion circuit 130 can select the placement criterion having the highest click through rate, or can select a plurality of placement criteria (from a group of placement criteria for a cluster) that have a quality metric above a threshold level.

Thus, in one example, the data processing system 110 identifies a cluster of ads. The cluster includes placement criteria (e.g., keywords) that can indicate the subject matter of the ads in the cluster and that can be used to place the ads with web pages for display at the user device 125. The data processing system 110 can obtain additional content such as an ad from the content provider 115 or from the database 140 and can determine that this content is related to the cluster. For example, the data processing system 110 can determine that the cluster and the additional content have the same or similar subject matter, or are of interest to overlapping categories of users. With a cluster associated with the additional content identified, the data processing system 110 can determine (or obtain from the database 140) the quality metrics of the placement criteria of the cluster.

In one implementation, the data processing system 110 provides the selected cluster placement criterion as a supplemental criterion for an ad or other content. For example, when a quality metric satisfies a threshold, the data processing system 110 can determine that the cluster placement criterion having the satisfactory quality metric may be useful as a criterion for the additional content. In this example, the keywords or other placement criteria of the additional content may be expanded to include the supplemental placement criterion, and the supplemental placement criterion can be used to place the additional content with one or more web pages.

In one implementation, the cluster of content items such as online ads or other content can be expanded to include the additional content. For example, the data processing system 100 can define a cluster as including 50 ads. Each of the 50 ads may be associated with a number of placement criteria, such as keywords, so that there may be hundreds of keywords for the cluster. In one implementation, the quality metric circuit 135 determines a quality metric for the keywords in the cluster, and excludes keywords that fail to satisfy a threshold standard of quality from the cluster to reduce the overall number of keywords associated with the cluster.

Continuing with this example, the data processing system 110 can identify a $51^{st}$ ad, and can determine that the $51^{st}$ ad is of interest to a category of anonymous users that are likely to be interested in the cluster of 50 ads. Due to a level of similarity (e.g., semantic or user based) between the $51^{st}$ ad and the cluster of 50 ads, some of the keywords of the cluster may also be relevant to the $51^{st}$ ad. In one implementation, the data processing system 110 identifies high performing placement criteria of the cluster, and applies them to the $51^{st}$ ad, resulting in more effective or valuable placement of the $51^{st}$ ad with web pages or other documents of the network 105. For example, placement criteria of the cluster having a click through rate or other quality metric above a threshold can be identified as supplemental criteria for the $51^{st}$ ad.

In one implementation, the data processing system 110 compares a quality metric of a supplemental placement criterion (e.g., from the cluster of 50 ads) with placement criteria of additional content (e.g., the $51^{st}$ ad). For example, the data processing system 110 can add the supplemental placement criterion to a group of placement criteria used to place the $51^{st}$ ad when the quality metric of the supplemental placement criterion is better than a quality metric of at least one placement criterion of the $51^{st}$ ad. In this example, the placement criteria of the $51^{st}$ ad are expanded to include at least one supplemental placement criterion. In some implementations, the data processing system 110 expands the cluster (e.g., of the 50 ads) to include the additional content (e.g., the $51^{st}$ ad). The number of ads or other pieces of content in a cluster can vary, and the data processing system 110 can define a cluster as including one or more ad or other piece of content.

Figure 2:
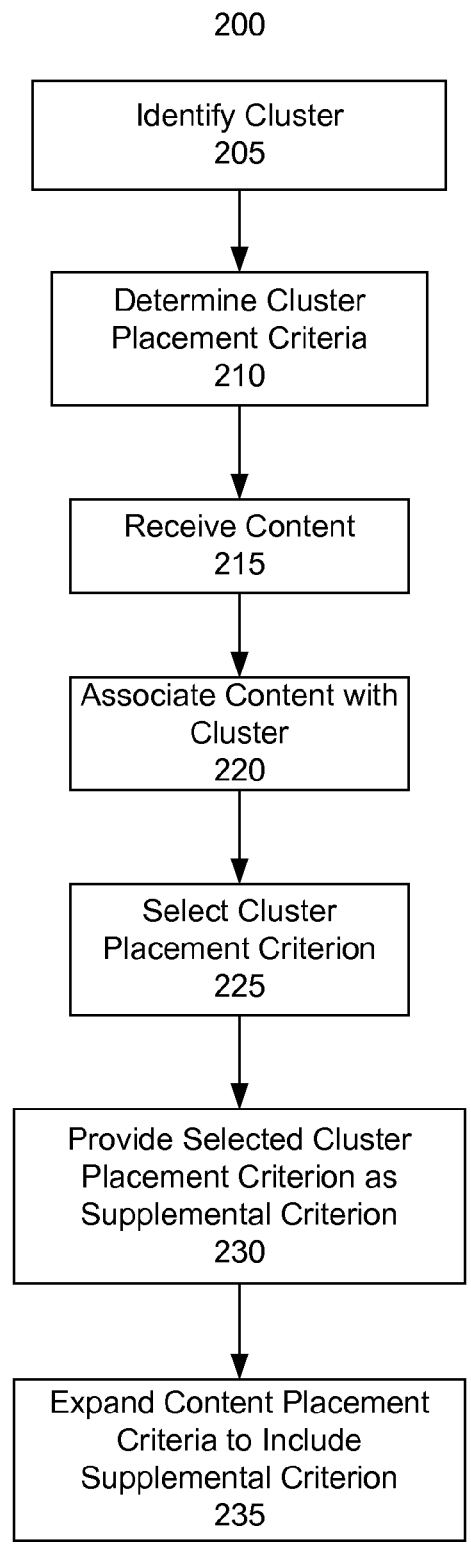
FIG. 2 is a flow diagram depicting a method of providing information via a computer network, according to an illustrative implementation.

FIG. 2 illustrates a flow diagram depicting flow diagram depicting a method 200 of providing information via a computer network in accordance with an implementation. The method 200 can identify a cluster of online content items such as ads or other content (BLOCK 205). The identified cluster can include ads having a similar characteristic. For example, the ads identified as part of a cluster can relate to the same or similar subject matter (e.g., a semantic similarity) or can relate to different subject matter but be of interest to the same or a similar category of users (e.g., a user interest similarity). In one implementation, the data processing system identifies a cluster of ads having semantic or user similarity (BLOCK 205). The similar ads can be determined to be part of a cluster, and information indicating which ads are part of a cluster can be stored in a database.

In one implementation, the method 200 determines cluster placement criteria associated with the cluster (BLOCK 210). For example, ads that are part of a cluster can each have placement criteria such as keywords used to place the ads with web pages. The cluster placement criteria can include at least some of the criteria of the individual ads or other content that form the cluster. The data processing system can communicate with at least one content provider or database to identify the placement criteria of the ads that form the cluster (BLOCK 210).

The method 200 can receive content configured for display with a web page (BLOCK 215). For example, the data processing system can obtain an ad from the database or from a content provider for display with a web page at a user device. In some implementations, the method 200 associates the content with a cluster (BLOCK 220). For example, the data processing system can associate the content with the cluster (BLOCK 215) when the received content (BLOCK 210) is identified as being similar to content of the cluster. The similarity between the subject matter of the cluster and the subject matter of the received content can be semantic or user-based.

In some implementations, the method 200 selects at least one cluster placement criterion from the placement criteria of the cluster (BLOCK 225). For example, the data processing system can determine a click through rate or other quality metric of the placement criteria of the cluster, and select the placement criterion having the best quality metric, such as the highest click through rate (BLOCK 225). The selected placement criterion (BLOCK 225) can be associated with the received content (BLOCK 210) and used to match the received content with at least one web page for content placement with the web pages.

In one implementation, the method 200 provides the selected cluster placement criterion as a supplemental placement criterion of the received content (BLOCK 230). For example, the received content can be added to the cluster, or the supplemental placement criterion can be added to a group of placement criteria of the received content. In one implementation, the method 200 expands content placement criteria of the received content to include the supplemental criterion (BLOCK 235).

Figure 3:
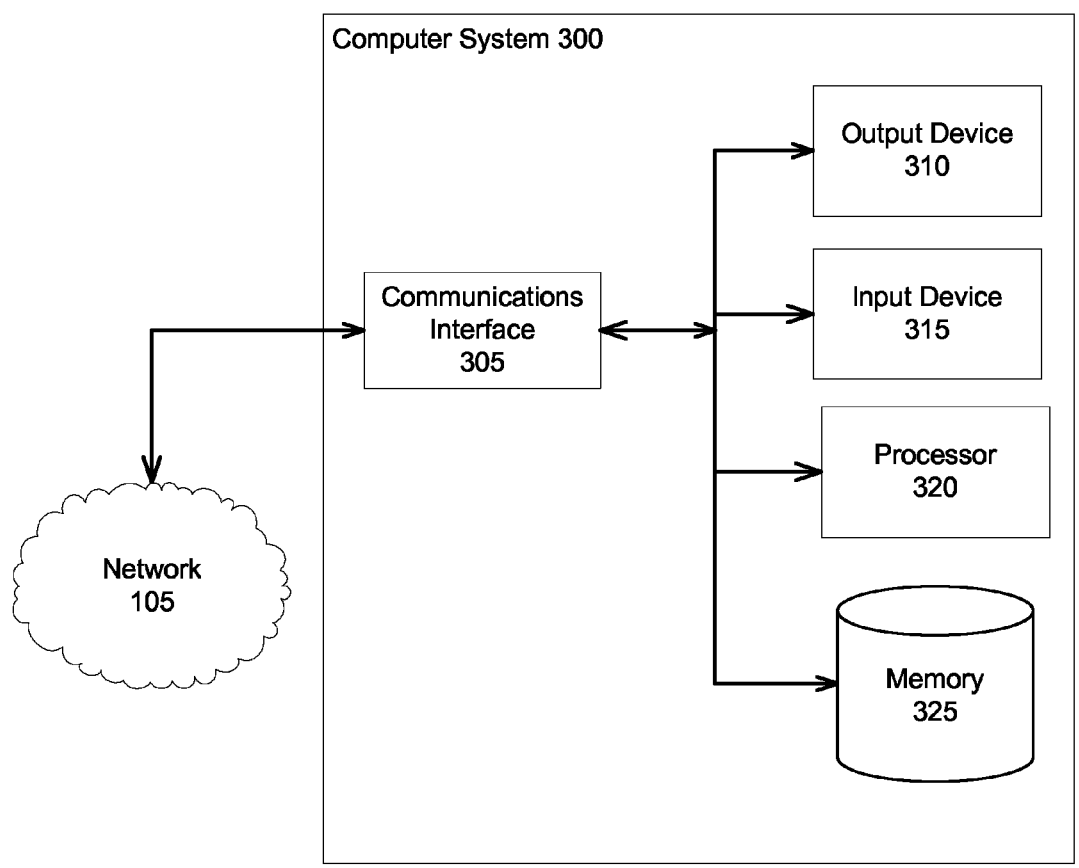
FIG. 3 is a block diagram illustrating a general architecture for a computer system that may be employed to implement various elements of the systems and methods described and illustrated herein, according to an illustrative implementation.

FIG. 3 shows the general architecture of an illustrative computer system 300 that may be employed to implement any of the computer systems discussed herein (including the system 100 and its components such as the data processing system 110, the criteria expansion circuit 130, or the quality metric circuit 135) in accordance with some embodiments. The computer system 300 can be used to identify supplemental placement criteria for ads or other content to provide content via the network 105. The computer system 300 of FIG. 3 comprises one or more processors 320 communicatively coupled to memory 325, one or more communications interfaces 305, and one or more output devices 310 (e.g., one or more display units) and one or more input devices 315. The processors 320 can be included in the data processing system 110 or the other components of the system 100 such as the criteria expansion circuit 130 or the quality metric circuit 135.)

In the computer system 300 of FIG. 3, the memory 325 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the criteria expansion circuit 130 or the quality metric circuit 135 can include the memory 325 to store the ads or other content, their placement criteria, and cluster information, such as an indication of the content that forms a cluster, as well as user interest or semantic similarity information. The memory 325 can include the database 140. The processor(s) 320 shown in FIG. 3 may be used to execute instructions stored in the memory 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 300. Examples of communications interfaces 305 include user interfaces (e.g., web pages) having content (e.g., advertisements) selected by the data processing system 110 for placement on the web pages.

The output devices 310 of the computer system 300 shown in FIG. 3 may be provided, for example, to allow various information to be viewed or otherwise perceived in connection with execution of the instructions. The input device(s) 315 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided further herein.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus" "data processing system" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The criteria expansion circuit 130 and the quality metric circuit 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 300 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the data processing system 110, the criteria expansion circuit 130, and the quality metric circuit 135 can be a single module, a logic device having one or more processing circuits, part of a search engine, or part of an ad placement system.

Having now described some illustrative implementations and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementations," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, placement criteria can include terms other than keywords, such as index terms, search terms, metadata, placement information, anonymous user lists, or information about anonymous user interests. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of providing cluster placement criteria for use to select content for display via a computer network, comprising:
    identifying, by a data processing system, a cluster of a plurality of similar online content items based, at least in part, on a semantic similarity of the online content items;
    determining a plurality of cluster-placement criteria associated with the cluster, including identifying one or more keywords that are used to control distribution of the online content items in the cluster;
    identifying a quality metric of at least one of the plurality of cluster placement criteria, the quality metric including at least one of a click through rate or a conversion rate of the online content items in the cluster when the cluster placement criteria is used to distribute the online content items;
    receiving a given content item that is available for display with a web page, the given content item being associated with a content placement criterion;
    associating the given content item with the cluster based on at least a semantic similarity between the given content item and the online content items in the cluster;
    determining that the content placement criterion differs from at least one of the cluster placement criteria;
    in response to determining that the content placement criterion differs from the at least one of the cluster placement criteria, selecting a cluster placement criterion of the plurality of cluster placement criteria as a supplemental placement criterion for the given content item, wherein the selection is based, at least in part, on the quality metric; and distributing the given content item using the supplemental criterion.

2. The computer implemented method of claim 1 further comprising:
    determining that the quality metric satisfies a threshold.

3. The computer implemented method of claim 1, further comprising:
    expanding the cluster to include the given content item.

4. The computer implemented method of claim 1, further comprising:
    determining a quality metric of each of the plurality of cluster placement criteria.

5. The computer implemented method of claim 1, further comprising:
    identifying the semantic similarity of the online content items based at least in part on subject matter of the plurality of online content items.

6. The computer implemented method of claim 1, further comprising:
    associating the given content item with the cluster based at least in part on the content placement criteria.

7. A system of providing cluster placement criteria for use to select content for display via a computer network, comprising:
    a data processing system having one or more processors configured to:
    define a cluster of a plurality of similar online content items based, at least in part, on, a semantic similarity of the online content items;
    determine a plurality of cluster placement criteria associated with the cluster, including identifying one or more keywords that are used to control distribution of the online content items in the cluster;
    identify a quality metric of at least one of the plurality of cluster placement criteria, the quality metric including at least one of a click through rate or a conversion rate of the online content items in the cluster when the cluster placement criteria is used to distribute the online content items;
    receive a given content item that is available for display with a web page, the given content item being associated with a content placement criterion;
    associating the given content item with the cluster based on at a semantic similarity between the given content item and the online content items in the cluster;
    determining that the content placement criterion differs from at least one of the cluster placement criteria;
    in response to determining that the content placement criterion differs from the at least one of the cluster placement criteria, select a cluster placement criterion of the plurality of cluster placement criteria as a supplemental placement criterion for the given content item, wherein the selection is based on the quality metric; and
    distribute the given content item using the supplemental criterion.

8. The system of claim 7, further comprising the data processing system configured to:
    determine that the quality metric satisfies a threshold.

9. The system of claim 7, further comprising the data processing system configured to:
    expand the cluster to include the given content item.

10. The system of claim 7, further comprising the data processing system configured to:
    determine a quality metric of each of the plurality of cluster placement criteria.

11. The system of claim 7, further comprising the data processing system configured to:
    identify the semantic similarity of the online content items based at least in part on subject matter of the plurality of online content items.

12. The system of claim 7, further comprising the data processing system configured to:
    include the given content item in the cluster based at least in part on the content placement criteria.

13. A computer readable storage medium having instructions to provide cluster placement criteria for use to select content for display via a computer network, the instructions comprising instructions to:
    identify a cluster of a plurality of similar online content items based, at least in part, on a semantic similarity of the online content items;
    determine a plurality of cluster-placement criteria associated with the cluster, including identifying one or more keywords that are used to control distribution of the online content items in the cluster;
    identify a quality metric of at least one of the plurality of cluster placement criteria, the quality metric including at least one of a click through rate or a conversion rate of the online content items in the cluster when the cluster placement criteria is used to distribute the online content items;
    receive a given content item that is available for display with a web page, the given content item being associated with a content placement criterion;
    associate the given content item with the cluster based on at least a semantic similarity between the given content item and the online content items in the cluster;
    determine that the content placement criterion differs from at least one of the cluster placement criteria;
    in response to determining that the content placement criterion differs from the at least one of the cluster placement criteria, select a cluster placement criterion of the plurality of cluster placement criteria as a supplemental placement criterion for the given content item, wherein the selection is based, at least in part, on the quality metric; and
    distribute the given content item using the supplemental criterion.

14. The computer readable storage medium of claim 13, further comprising instructions to:
    expand the cluster to include the given content item.

15. The computer readable storage medium of claim 13, further comprising instructions to:
    identify the semantic similarity of the online content items based at least in part on subject matter of the plurality of online content items.

* * * * *